United States Patent [19]

Sasaki et al.

[11] Patent Number: 4,904,227
[45] Date of Patent: Feb. 27, 1990

[54] STOPPER APPARATUS FOR INNER MEMBER IN SLIDING UNIVERSAL JOINTS

[75] Inventors: Akira Sasaki; Seiji Esaki, both of Utsunomiya; Yasushi Hashimoto; Shigeo Kurita, both of Tochigi, all of Japan

[73] Assignee: Honda Giken Kogyo Kabushiki Kaisha, Tokyo, Japan

[21] Appl. No.: 187,141

[22] Filed: Apr. 28, 1988

[30] Foreign Application Priority Data

Apr. 30, 1987 [JP] Japan ................... 62-66093

[51] Int. Cl.$^4$ .............................................. F16D 3/20
[52] U.S. Cl. .................... 464/111; 464/123; 464/905
[58] Field of Search ............... 464/111, 120, 123, 124, 464/146, 162, 169, 905, 906

[56] References Cited

U.S. PATENT DOCUMENTS

| | | | |
|---|---|---|---|
| 3,613,396 | 10/1971 | Drevard et al. | 464/111 |
| 3,745,789 | 7/1973 | Orain | 464/905 X |
| 3,757,534 | 9/1973 | Orain | 464/111 |
| 4,027,927 | 6/1977 | Turner. | |
| 4,516,957 | 5/1985 | Chyz et al. | 464/111 |

FOREIGN PATENT DOCUMENTS

| | | |
|---|---|---|
| 2309398 | 9/1973 | Fed. Rep. of Germany. |
| 2702940 | 7/1977 | Fed. Rep. of Germany. |
| 2714731 | 10/1977 | Fed. Rep. of Germany. |
| 3626544 | 2/1987 | Fed. Rep. of Germany. |
| 774637 | 10/1980 | U.S.S.R. ................ 464/146 |
| 950009 | 2/1964 | United Kingdom. |
| 2165622 | 4/1986 | United Kingdom ............ 464/111 |

Primary Examiner—Daniel P. Stodola
Attorney, Agent, or Firm—Armstrong, Nikaido, Marmelstein, Kubovcik & Murray

[57] ABSTRACT

A stopper is slidably mounted on a bearing surface on the end wall of the inner member accommodating chamber of the outer member of a sliding-type universal joint. The bearing surface can be provided on a raised portion of the end wall larger in diameter than the diameter of a flange provided on the base of the stopper. The bearing surface is perpendicular to the axis of the outer member. A retainer in the form of a cylindrical member can be fitted to the outer periphery of the raised portion and can have an engagement portion to engage the flange of the stopper while allowing radial play of the stopper.

1 Claim, 1 Drawing Sheet

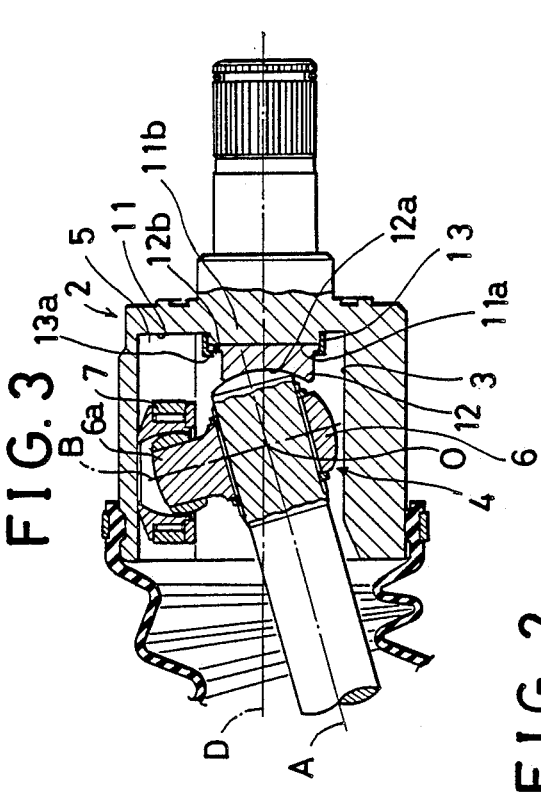
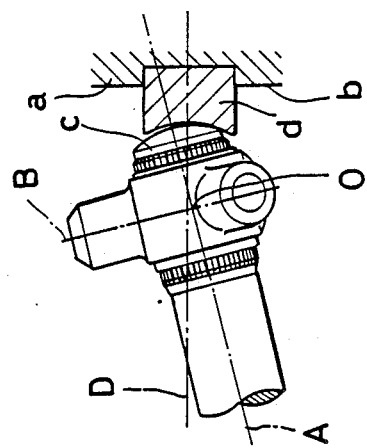
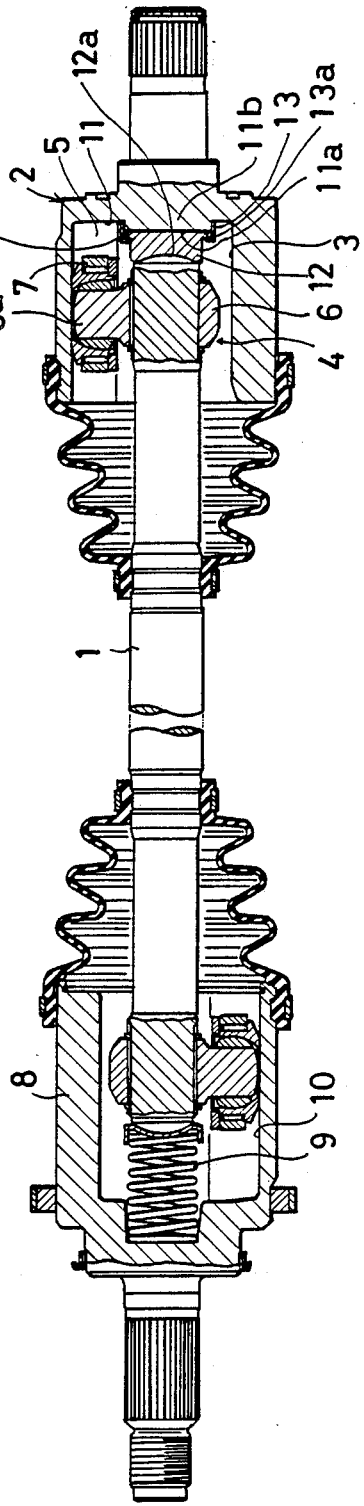

STOPPER APPARATUS FOR INNER MEMBER IN SLIDING UNIVERSAL JOINTS

BACKGROUND OF THE INVENTION

The present invention relates chiefly to a stopper apparatus for the inner member used in a tripod type sliding universal joint which is applied mainly to automobiles.

A conventional universal joint, as disclosed in U.S. Pat. No. 3,613,396, has a structure in which a stopper d is rigidly secured to the end wall b of an inner member accommodating chamber formed in an outer member a, the stopper d being there to receive the end surface of the inner member c which is urged toward the end wall b, as shown in FIG. 1.

Generally, the end surface of the inner member c of a tripod type sliding universal joint is formed as a spherical shape which has its center at an intersecting point O at which the axis A of the inner member c intersects the axis B of a radially projecting portion of the inner member c. The surface of the stopper d that receives the end surface of the inner member c is formed as a correspondingly recessed spherical surface for engagement. When power transmission is performed through the outer member a and the inner member c which are engaged with each other in such a manner that their axes A and D obliquely intersect each other, the intersecting point O deviates from the axis D of the outer member a, this deviation being the so-called center deviation of the inner member c whose magnitude is determined by the angle formed between the axes of the two members a and c. This causes the end surface of the inner member c to have only a partial contact with the stopper, resulting in an unsymmetrical wear of the inner member c.

OBJECT AND SUMMARY OF THE INVENTION

The object of this invention is to provide an apparatus that overcomes the above problem.

In a universal joint in which a stopper apparatus for an inner member thereof comprises a stopper provided on the end wall of an inner member accommodating chamber formed in an outer member thereof, so as to receive the end surface of the inner member which is urged toward the end wall, this invention has achieved the above object by mounting the stopper on the end wall in such a way that it can be moved along the surface perpendicular to the axis of the outer member.

Since the stopper is mounted on the end wall of the outer member in such a manner that it can be moved along the surface which is perpendicular to the axis of the outer member, when power transmission is performed through the outer member and the inner member which are engaged with each other with their axes obliquely intersecting each other, the stopper moves to follow and offset the center deviation of the inner member so that the end surface of the inner member can be kept in proper contact with the stopper at all times.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 1 is an explanatory diagram of a conventional universal joint;

FIG. 2 is a cross sectional view of one example of the sliding universal joint designed according to this invention; and FIG. 3 is a cross section of an essential part of the universal joint of FIG. 2 showing operation of the joint.

DETAILED DESCRIPTION OF THE PREFERRED EMBODIMENT

The accompanying drawings show an embodiment of this invention as applied to a sliding universal joint which is provided on the inboard side (to the right in the drawing) of the drive shaft 1 of a front-wheel drive motor vehicle. A first outer member 2 is formed with an inner member accommodating chamber 3. An inner member 4 is installed in the chamber 3 and is made up of the end portion of the drive shaft 1 and a spider 6 secured thereto. The first outer member 2 is provided with three axially extending guide groves formed thereon to be spaced equidistantly from each other along the circumferences thereof. The spider 6 is provided with three radially projecting portions 6a. The projecting portions 6a are each engaged with the guide groove 5 through each outer roller 7 fitted thereto rotatably and swingably and also slidably along the axis of the portion 6a. They are arranged as above to make up a tripod type sliding universal joint.

A second outer member 8 of another tripod type sliding universal joint similar to the foregoing joint is provided on the outboard side of the drive shaft 1 (to left in the drawing).

A spring 9 is disposed in the inner member accommodating chamber 10 formed in the second outer member 8 to urge the drive shaft 1 toward the inboard side.

A stopper 12 is provided on the end wall 11 of the inner member accommodating chamber 3 formed in the first outer member 2 on the inboard side to receive the end surface of the inner member 4 or drive shaft 1 which is urged by the spring 9 toward the end wall 11. The end surface of the drive shaft 1 is formed as a spherical shape whose center is at the intersecting point O where the axis A of the shaft 1 and the axis B of each projecting portion 6a intersect each other. The stopper 12 is provided with a spherically recessed receiving surface 12a for receiving the end surface of the inner member 4. The end wall 11 in the first outer member 2 has a raised portion 11b which is larger in diameter than a flange 12b formed at the base of the stopper 12. Formed on the front end of the raised portion 11b is a bearing surface 11a which is disposed perpendicular to the axis D of the first outer member 2 and supports the stopper 12 slidably seated thereon through its flange 12b. A cylindrical retainer 13, which has at its front end an engagement portion 13a to engage with the front surface of the flange 12b and which surrounds the flange 12b in such a manner as to provide play in the radical direction, is fitted onto the outer periphery of the raised portion 11b so as to hold the stopper 12 against its coming off from the bearing surface 11a.

In the above construction, when power transmission is performed through the first outer member 2 and the inner member 4 which are engaged with each other to have their two axes A and D obliquely intersect each other as explained in the foregoing, the stopper 12 moves along the bearing surface 11a to follow and offset the center deviation of the inner member 4, as shown in FIG. 3, so that the end surface of the inner member 4 or the drive shaft 1 is always kept in the proper contact with the spherically recessed receiving surface 12a of the stopper 12.

According to this invention, since the stopper can move along the surface perpendicular to the axis of the outer member so as to follow and offset the deviation of the center of the inner member, the end surface of the inner member is kept in good contact with the stopper at all times. This prevents an unsymmetrical wear of the inner member and thus enhances the durability of the universal joint. Another advantage of this invention is that the construction of the apparatus is simple and inexpensive because the above effect is achieved by simply making the stopper movable.

It is readily apparent that the above-described meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A sliding universal joint comprising:

an outer member having an axis and an inner member accommodating chamber formed therein, said chamber having an end wall, said end wall having a central part and a raised portion integrally formed in said central part, said raised portion having an outer periphery, a diameter, and a bearing surface formed thereon perpendicular to said axis of said outer member;

an inner member positioned in said chamber and having an end surface urged toward said end wall;

a stopper slidably seated on said bearing surface of said end wall and receiving said end surface of said inner member, said stopper having a base and an annular flange extending laterally from said base, said flange having a front surface and a diameter smaller than said diameter of said raised portion of said end wall; and retainer means provided on said end wall for preventing said stopper from coming off of said bearing surface, said retainer means comprising a cylindrical member having one end fitted to said outer periphery of said raised portion and an engagement portion on its other end, said engagement portion engaging with said front surface of said flange, said cylindrical member enclosing said flange in such a manner as to leave play in a radial direction.

* * * * *